United States Patent
Nielson et al.

(10) Patent No.: US 10,656,309 B2
(45) Date of Patent: *May 19, 2020

(54) OVERCOAT WIRE GRID POLARIZER HAVING OVERCOAT LAYER SPANNING AIR-FILLED CHANNELS

(71) Applicant: Moxtek, Inc., Orem, UT (US)

(72) Inventors: R. Stewart Nielson, Pleasant Grove, UT (US); Bradley R. Williams, Pocatello, ID (US); Mathew Free, Orem, UT (US); Ted Wangensteen, Pleasant Grove, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,768

(22) Filed: Aug. 30, 2019

(65) Prior Publication Data

US 2019/0391299 A1 Dec. 26, 2019

Related U.S. Application Data

(63) Continuation of application No. 15/691,315, filed on Aug. 30, 2017, now Pat. No. 10,444,410, which is a
(Continued)

(51) Int. Cl.
*G02B 1/04* (2006.01)
*G02B 1/11* (2015.01)
(Continued)

(52) U.S. Cl.
CPC ............ *G02B 1/18* (2015.01); *C09D 1/00* (2013.01); *C09D 5/08* (2013.01); *C09D 5/084* (2013.01);
(Continued)

(58) Field of Classification Search
CPC ............ G02B 5/3025; G02B 5/3058; G02B 27/28–288; G02F 1/133536;
(Continued)

(56) References Cited

U.S. PATENT DOCUMENTS 6,288,840 B1  9/2001  Perkins et al.
6,447,120 B1  9/2002  Hanssen et al.
(Continued)

FOREIGN PATENT DOCUMENTS

KR   10-2016/0031613 A   3/2016
WO   WO 2009/104861 A1   8/2009
WO   WO 2011/132992 A2   10/2011

OTHER PUBLICATIONS

Accuratus; "Aluminum Oxide | $Al^2O^3$ Ceramic Properties;" Al203 Material Properties; (Jul. 29, 2016); 3 pages; [retrieved May 31, 2019]; Retrieved from <URL: https://accuratus.com/alumox.html>.
(Continued)

*Primary Examiner* — Ryan S Dunning
(74) *Attorney, Agent, or Firm* — Thorpe, North & Western, LLP

(57) ABSTRACT

A wire grid polarizer (WGP) can be durable and have high performance. The WGP can comprise an array of wires 13 on a substrate 11. An overcoat layer 32 can be located at distal ends of the array of wires 13 and can span channels 15 between the wires 13. A conformal-coat layer 61 can coat sides $13_s$ and distal ends $13_d$ of the wires 13 between the wires 13 and the overcoat layer 32. The overcoat layer can comprise aluminum oxide. An antireflection layer 33 can be located over the overcoat layer 32.

20 Claims, 4 Drawing Sheets

Figure 1:
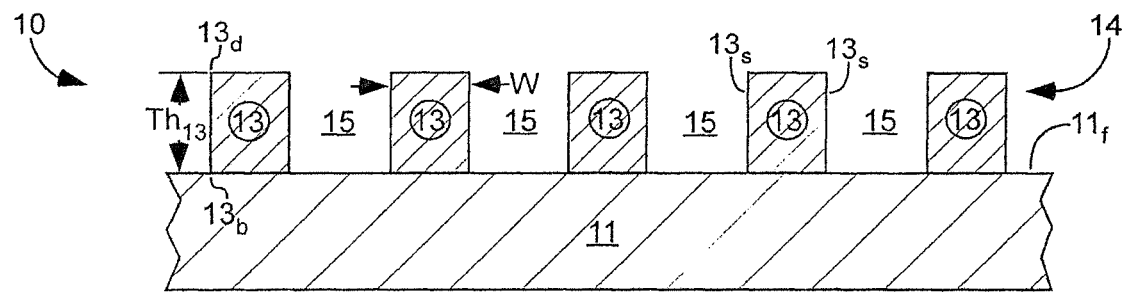

Related U.S. Application Data continuation-in-part of application No. 15/631,256, filed on Jun. 23, 2017, now Pat. No. 10,534,120.

(60) Provisional application No. 62/425,339, filed on Nov. 22, 2016, provisional application No. 62/375,675, filed on Aug. 16, 2016.

(51) Int. Cl.

| | | |
|---|---|---|
| *G02B 1/115* | (2015.01) | |
| *G02B 1/14* | (2015.01) | |
| *G02B 1/18* | (2015.01) | |
| *G02B 5/30* | (2006.01) | |
| *C09D 1/00* | (2006.01) | |
| *C09D 5/08* | (2006.01) | |
| *G03B 21/20* | (2006.01) | |
| *H04N 9/31* | (2006.01) | |
| *G02F 1/1335* | (2006.01) | |

(52) U.S. Cl.
CPC ............... *G02B 1/04* (2013.01); *G02B 1/11* (2013.01); *G02B 1/115* (2013.01); *G02B 1/14* (2015.01); *G02B 5/3058* (2013.01); *G03B 21/2073* (2013.01); *H04N 9/3167* (2013.01); *G02F 2001/133548* (2013.01)

(58) Field of Classification Search
CPC .... G02F 2001/133548; G02F 1/13362; H04N 9/3167
USPC ............... 216/24; 349/8, 9, 96; 359/485.05, 359/487.03, 487.05; 385/11, 132; 427/163.1; 428/1.31
See application file for complete search history.

(56) References Cited

U.S. PATENT DOCUMENTS

| | | |
|---|---|---|
| 6,585,378 B2 | 7/2003 | Kurtz et al. |
| 6,665,119 B1 | 12/2003 | Kurtz et al. |
| 6,785,050 B2 | 8/2004 | Lines et al. |
| 7,026,046 B2 | 4/2006 | Edlinger et al. |
| 7,961,393 B2 | 6/2011 | Perkins et al. |
| 8,576,672 B1 | 11/2013 | Peng et al. |
| 8,755,113 B2 | 6/2014 | Gardner et al. |
| 10,444,410 B2 * | 10/2019 | Nielson ............... G02B 1/14 |
| 2003/0224116 A1 | 12/2003 | Chen et al. |
| 2003/0227678 A1 | 12/2003 | Lines et al. |
| 2004/0218270 A1 | 11/2004 | Wang |
| 2006/0087602 A1 | 4/2006 | Kunisada et al. |
| 2007/0070276 A1 * | 3/2007 | Tan ................. G02B 5/3058 349/117 |
| 2008/0316599 A1 | 12/2008 | Wang et al. |
| 2009/0066885 A1 | 3/2009 | Kumai |
| 2009/0153961 A1 | 6/2009 | Murakami et al. |
| 2010/0225832 A1 | 9/2010 | Kumai |
| 2010/0225886 A1 | 9/2010 | Kumai |
| 2012/0008205 A1 | 1/2012 | Perkins et al. |
| 2012/0075699 A1 | 3/2012 | Davis et al. |
| 2012/0319222 A1 | 12/2012 | Ozawa et al. |
| 2013/0148053 A1 * | 6/2013 | Minoura ............ G02B 1/118 349/61 |
| 2015/0062500 A1 | 3/2015 | Park et al. |
| 2015/0160391 A1 * | 6/2015 | Tsuruoka ............ G02B 5/3075 359/352 |
| 2016/0062017 A1 | 3/2016 | Nielson et al. |
| 2016/0077263 A1 | 3/2016 | Kwak et al. |
| 2016/0291208 A1 | 10/2016 | Wangensteen et al. |
| 2016/0291209 A1 | 10/2016 | Diwan et al. |
| 2016/0299273 A1 | 10/2016 | Oh et al. |
| 2018/0052270 A1 | 2/2018 | Nielson et al. |
| 2018/0059301 A1 * | 3/2018 | An .................... G02F 1/1368 |
| 2018/0143364 A1 | 5/2018 | Wang et al. |
| 2018/0259698 A1 | 9/2018 | Nielson et al. |
| 2019/0041564 A1 | 2/2019 | Nielson et al. |

OTHER PUBLICATIONS

Institute for Microelectronics; "2.1 Silicon Dioxide Properties;" www.iue.tuwien.ac.at; (Jan. 21, 2013); 4 pages; [retrieved May 31, 2019]; Retrieved from <URL: www.iue.tuwien.ac.at/phd/filipovic/node26.html >.

* cited by examiner

OVERCOAT WIRE GRID POLARIZER HAVING OVERCOAT LAYER SPANNING AIR-FILLED CHANNELS

CLAIM OF PRIORITY

This is a continuation of U.S. patent application Ser. No. 15/691,315, filed on Aug. 30, 2017, which claims priority to US Provisional Patent Application No. 62/425,339, filed on Nov. 22, 2017, and is a continuation-in-part of U.S. patent application Ser. No. 15/631,256, filed on Jun. 23, 2017, which claims priority to U.S. Provisional Patent Application No. 62/375,675, filed on Aug. 16, 2016, all of which are incorporated herein by reference.

FIELD OF THE INVENTION

The present application is related generally to wire grid polarizers.

BACKGROUND

A wire grid polarizer (WGP) can be used to divide light into two different polarization states. A high percent of one polarization state can pass through the WGP and a high percent of the other can be absorbed or reflected. The effectiveness or performance of a WGP is based on a very high percent transmission of one polarization (Tp) and minimal transmission of an opposite polarization (Ts). It can be beneficial to have high contrast (Tp/Ts). The percent reflection of the opposite polarization (Rs) can also be an important indicator of polarizer performance.

Wires of WGPs, especially for polarization of visible or ultraviolet light, can have small, delicate wires with nanometer-sized pitch, wire-width, and wire-height. WGPs are used in systems (e.g. computer projectors, semiconductor inspection tools, etc.) that require high performance. Small defects in the WGP, such as corroded wires and collapsed wires can significantly degrade system performance (e.g. distorted image from a computer projector). Ordinary handling can cause the wires to collapse. Therefore, it can be important to protect the wires from corrosion and mechanical damage.

Oxidation can degrade performance by adversely affecting contrast and/or Rs. As an aluminum wire forms a natural oxide over time, the underlying, substantially-pure aluminum is consumed, thus reducing the size of the substantially-pure aluminum wire and changing polarization characteristics of the WGP.

SUMMARY

It has been recognized that it would be advantageous to have high wire grid polarizer (WGP) performance and to protect the wires from corrosion, mechanical damage, and oxidation. The present invention is directed to various embodiments of a WGP, and methods of making a WGP, that satisfy these needs. Each embodiment or method may satisfy one, some, or all of these needs.

The WGP can comprise an array of wires located over a face of a transparent substrate with channels between adjacent wires. An overcoat layer can be located at distal ends of the array of wires and can span the channels.

In one embodiment, a moisture-barrier layer can coat sides and distal ends of the wires between the wires and the overcoat layer. In another embodiment, an antireflection layer can be located over the overcoat layer.

The method of manufacturing a WGP can comprise the following steps in the following order:
1. Providing an array of wires over a face of a transparent substrate with channels between adjacent wires. The channels can be air-filled. Each wire can have a cross-sectional profile with a base located closest to the substrate and a distal end located farthest from the substrate. Each wire can have opposite sides facing the channels on opposite sides of the wire, respectively, and extending from the base to the distal end.
2. Applying a moisture-barrier layer to the sides and to the distal ends of the wires while maintaining the channels air-filled.
3. Applying an overcoat layer, over the moisture-barrier layer, at the distal ends of the array of wires and spanning the channels, and maintaining the channels air-filled.

BRIEF DESCRIPTION OF THE DRAWINGS (DRAWINGS MIGHT NOT BE DRAWN TO SCALE)

FIG. 1 is a schematic, cross-sectional side-view of a wire grid polarizer (WGP) 10 with an array of wires 13 over a face $11_f$ of a transparent substrate 11, with channels 15 between adjacent wires 13, in accordance with an embodiment of the present invention.

Figure 2:
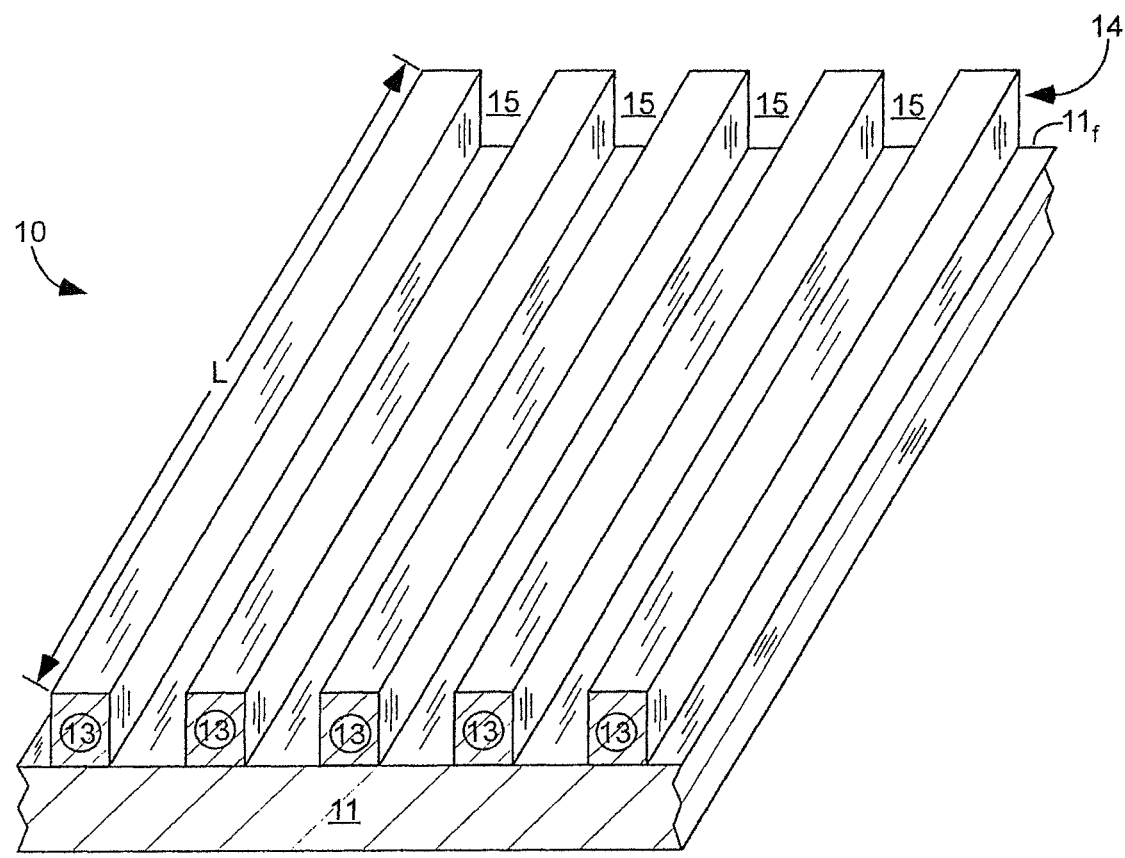

FIG. 2 is a schematic perspective-view of the WGP 10 of FIG. 1, in accordance with an embodiment of the present invention.

Figure 3:
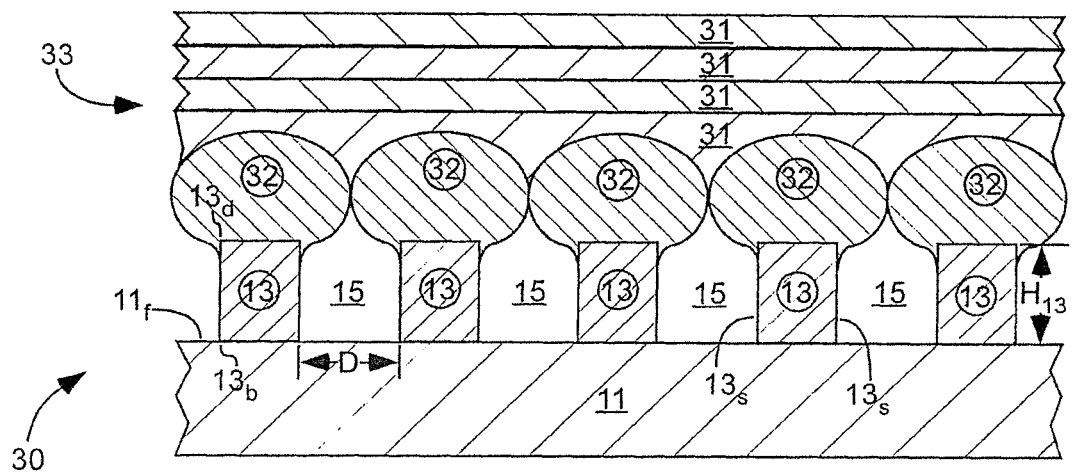
Figure 4:
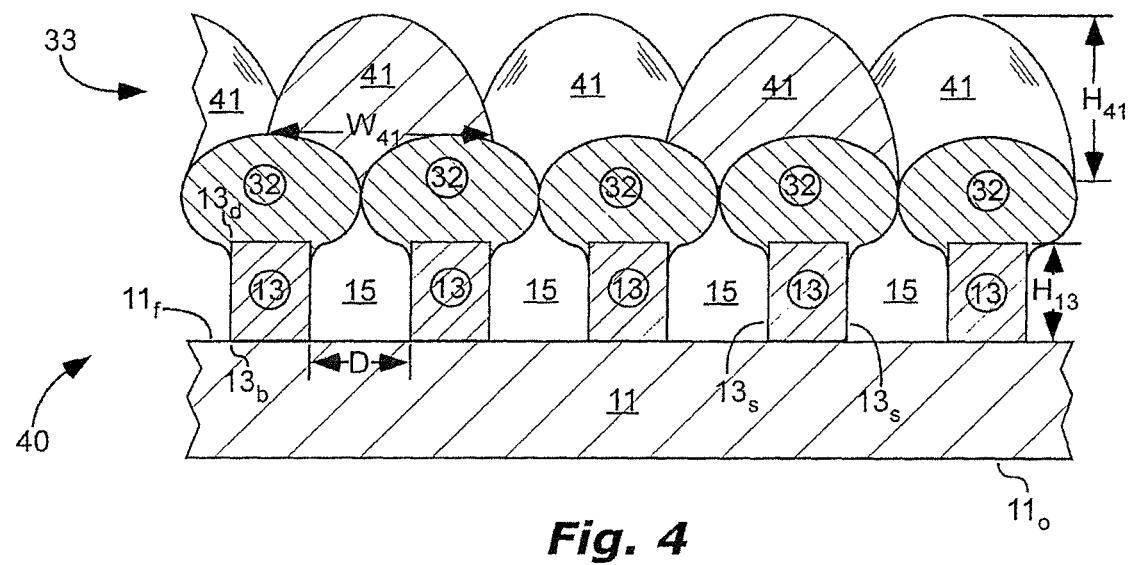

FIGS. 3-4 are schematic, cross-sectional side-views of WGPs 30 and 40, similar to WGP 10 of FIGS. 1-2, but further comprising an overcoat layer 32 at distal ends $13_d$ of the array of wires 13, the overcoat layer 32 spanning the channels 15, and an antireflection layer 33 located over the overcoat layer 32, in accordance with an embodiment of the present invention.

Figure 5:
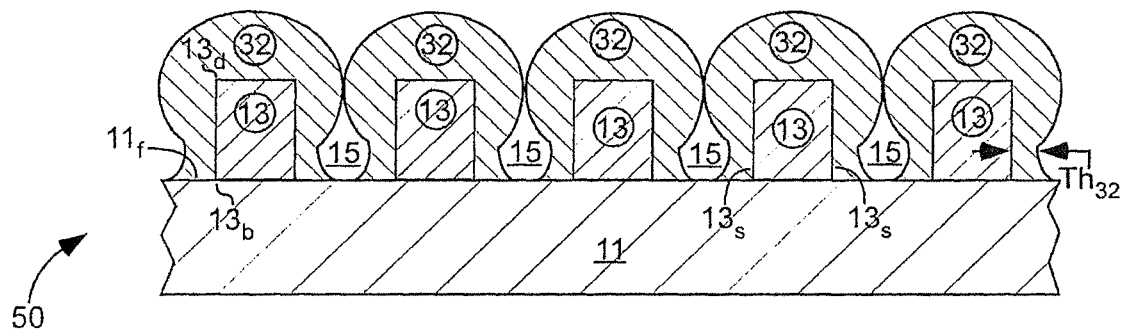

FIG. 5 is a schematic, cross-sectional side-view of a WGP 50, similar to WGP 10 of FIGS. 1-2, but further comprising an overcoat layer 32 at distal ends $13_d$ of the array of wires 13, the overcoat layer 32 spanning the channels 15 and extending down sides $13_s$ of the wires 13 from a distal end $13_d$ to a base $13_b$, in accordance with an embodiment of the present invention.

Figure 6:
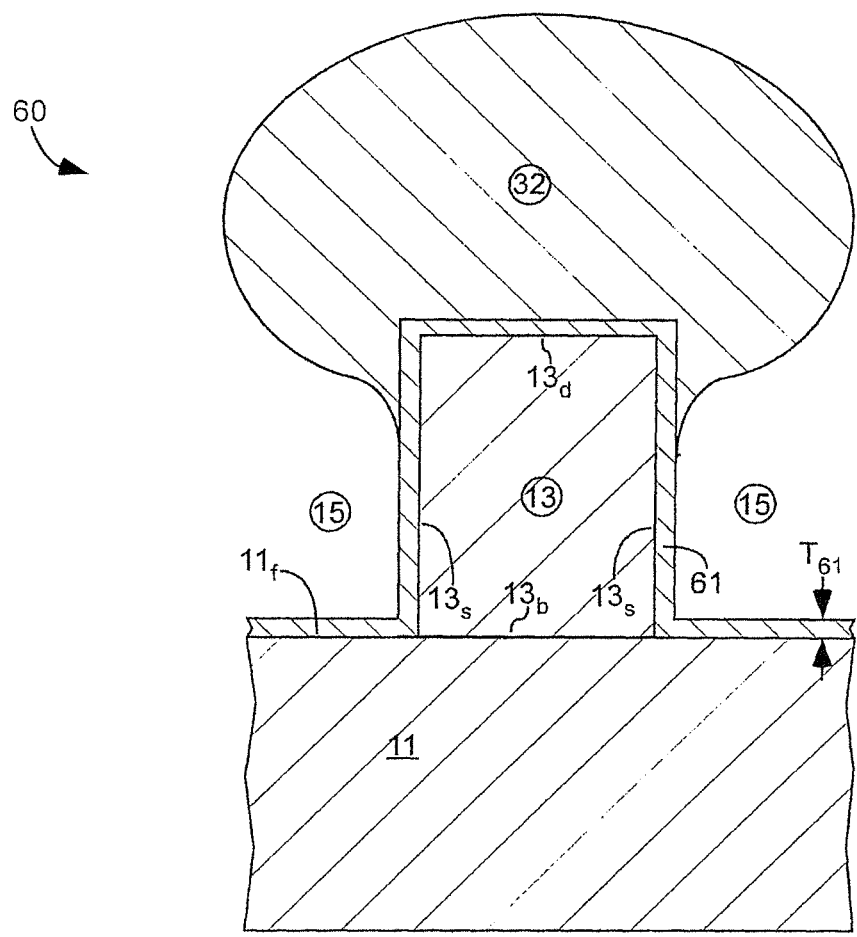

FIG. 6 is a magnified, schematic, cross-sectional side-view of a portion of a WGP 60 (showing one wire 13), similar to WGP 10 of FIGS. 1-2, but further comprising an overcoat layer 32 at a distal end $13_d$ of the wire 13 and a conformal-coat layer 61 that coats the sides $13_s$ of the wire 13 and the distal end $13_d$ of the wire 13 between the wire 13 and the overcoat layer 32, in accordance with an embodiment of the present invention.

Figure 7:
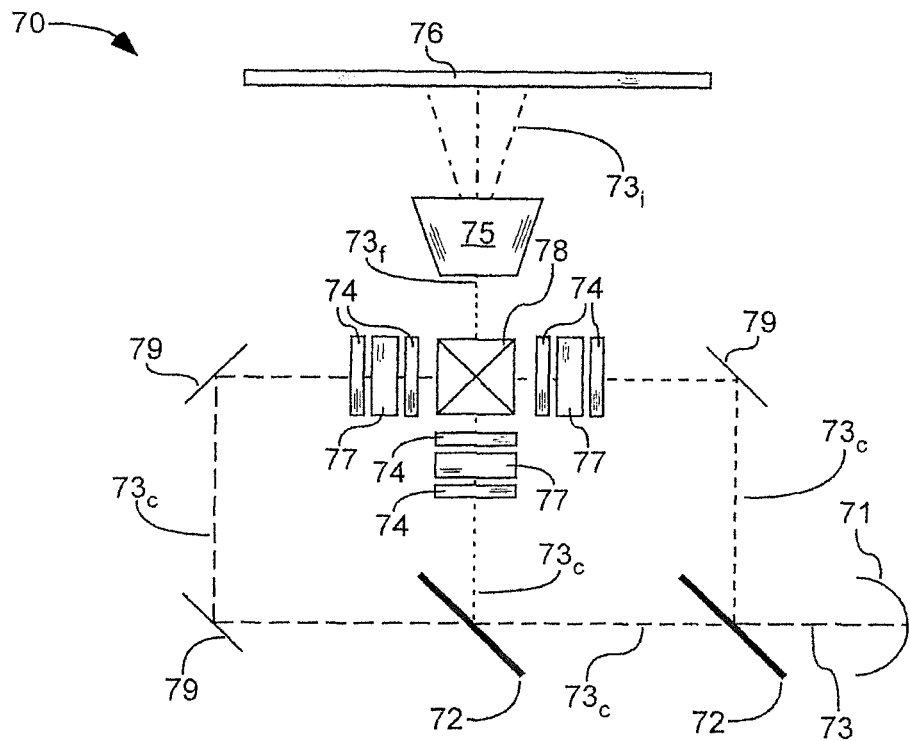
Figure 8:
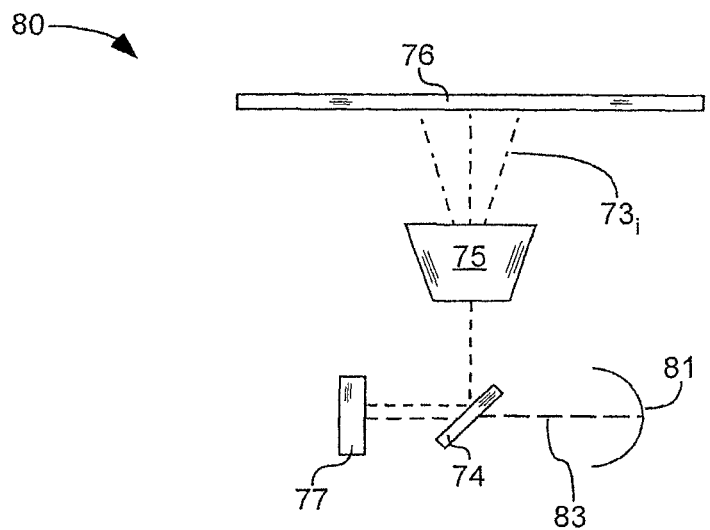

FIGS. 7-8 are schematic views of image projectors 70 and 80, each with at least one WGP 74, in accordance with embodiments of the present invention.

DEFINITIONS

As used herein, the term "conformal-coat layer" means a layer that conforms to a topology of the WGP.

As used herein, the term "degradation of Rs" means an increase in Rs for a selectively-absorptive WGP or a decrease in Rs for a reflective WGP.

As used herein, the term "elongated" means that a length L of the wires 13 is substantially greater than wire width W or wire thickness $Th_{13}$ (see FIGS. 1-2). For example, WGPs for ultraviolet or visible light can have a wire width W between 20 and 100 nanometers and wire thickness $Th_{13}$ between 50 and 500 nanometers; and wire length L of about 1 millimeter to 20 centimeters or more, depending on the application. Thus, elongated wires 13 can have a length L that is many times (e.g. at least 10 times, at least 100 times, at least 1000 times, or at least 10,000 times) larger than wire width W and/or wire thickness $Th_{13}$. The term "elongated" can also mean that the length L of the wires 13 is longer than any wavelength in the wavelength range of intended use. For example, the length L can be greater than 700 nm, the longest wavelength of visible light.

As used herein, the term "located on" means located directly on or located above with some other solid material between.

As used herein, the term "Tp" means a percent transmission of a predominantly-transmitted polarization (usually p-polarization); the term "Ts" means a percent transmission of the opposite polarization (usually s-polarization); and the term "Rs" means a percent reflection of the opposite polarization.

DETAILED DESCRIPTION

As illustrated in FIGS. 1-2, a wire grid polarizer (WGP) 10 is shown comprising an array of wires 13 located over a face $11_f$ of a transparent substrate 11. The array of wires 13 can be substantially-parallel and elongated, with channels 15 between adjacent wires 13. The channels 15 can be filled with a solid, a liquid, a vacuum, or a gas, such as air. Each wire 13 can have a cross-sectional profile with a base $13_b$ located closest to the substrate 11, a distal end $13_d$ located farthest from the substrate 11, and opposite sides $13_s$ facing the channels 15 on opposite sides $13_s$ of the wire, respectively, and extending from the base $13_b$ to the distal end $13_d$. Each wire 13 can be made of or include materials for polarization of light, including metals and/or dielectrics, as are typically used in wires of wire grid polarizers. See for example U.S. Pat. Nos. 7,961,393 and 8,755,113, which are incorporated herein by reference.

As shown in FIGS. 3-6, an overcoat layer 32 can be located at the distal ends $13_d$ of the array of wires 13 and can span the channels 15. The overcoat layer 32 can provide structural-support for the wires 13 to keep them from toppling, and may allow handling and cleaning the WGP 30, 40, or 50.

The overcoat layer 32 can span the channels 15 with minimal overcoat layer 32 entering the channels 15 as shown in FIGS. 3-4 and 6. Alternatively, the overcoat layer 32 can extend most or all of the way down the sides $13_s$ of the wires 13 as shown in FIG. 5.

The overcoat layer 32 can be a transparent dielectric, such as silicon dioxide for example. Careful selection of a material of the overcoat layer 32 can help avoid performance degradation of the WGP over time. For example, the overcoat layer 32 can comprise aluminum oxide which can protect the wires 13 from oxidation. A material composition of the overcoat layer 32 can be at least 99 mass percent aluminum oxide in one aspect, at least 90 mass percent aluminum oxide in another aspect, at least 50 mass percent aluminum oxide in another aspect, or at least 20 mass percent aluminum oxide in another aspect.

Due to imperfections in deposition of the overcoat layer 32, material of the overcoat layer 32 might not be in exact stoichiometric ratios. For example, the term aluminum oxide ($Al_2O_3$) means approximately two aluminum atoms for every three oxygen atoms, such as for example $Al_xO_y$, where $1.9 \leq x \leq 2.1$ and $2.9 \leq y \leq 3.1$.

Causing the overcoat layer 32 to extend part or all of the way down the sides $13_s$ from the distal end $13_d$ to the base $13_b$, as shown in FIG. 5, can protect the sides $13_s$ of the wires 13 from oxidation. The overcoat layer 32 can include a thickness $Th_{32}$ along the sides $13_s$ of between 10 and 100 nanometers. The overcoat layer 32 can have this thickness $Th_{32}$ at certain location(s) along the sides $13_s$ or along both sides $13_s$ from the distal end $13_d$ to the base $13_b$. Even with the overcoat layer 32 extending down the sides $13_s$ of the wires 13, the channels 15 can still be air-filled. Alternatively, because the overcoat layer 32 can adversely affect performance due to its index of refraction, it can extend only part-way down the sides $13_s$ of the wires from the distal end $13_d$ to the base $13_b$, such as for example <25% of the way in one aspect or between 10% and 50% of the way in another aspect.

WGPs described herein can have one or more of the following differentials between performance measured prior to a durability test and after the durability test: <0.01% increase of Ts, <0.005% increase of Ts, <0.001% increase of Ts, <1% degradation of Rs, <0.5% degradation of Rs, and <0.25% degradation of Rs. These values can be for a single WGP or can be averaged across 100 WGPs. The durability test is performed at a temperature of 300° C. for 168 hours or 500 hours. The durability test is performed immediately after manufacturing, or within three weeks after manufacturing if the WGP is maintained in a protected environment (e.g. room temperature, protected from ultraviolet light, low humidity, etc.), Without the overcoat layer 32, there was an average of about 0.04% increase of Ts and an average of about 3% degradation of Rs after the same durability test for 168 hours.

Prior to this invention, a primary failure of WGPs was toppled wires 13. Because the wires 13 were tall (e.g. about 200-400 nm) but not very wide W (e.g. about 50-70 nm), and the distal ends $13_d$ of the wires 13 were not secured, the wires 13 easily toppled. The inventors desired to create a stronger WGP with wires 13 that were less susceptible to toppling. Related US patent publications include US 2003/0224116, US 2012/0075699, U.S. Pat. Nos. 6,288,840, 6,665,119, and 7,026,046, which include some ideas for improving durability that have not been widely used, even though durability has been a very important issue, because some of these can also cause a substantial drop in WGP performance.

The inventors anticipated a significant drop in performance caused by addition of the overcoat layer 32, but added the overcoat layer 32 anyway because of a need for increased wire stability. The inventors discovered that performance drop, caused by addition of the overcoat layer 32, could be avoided by adding an antireflection layer 33 located over the overcoat layer 32 (see FIGS. 3-4). The overcoat layer 32 can provide a base or foundation for applying the antireflection layer 33. Any performance drop, caused by addition of the overcoat layer 32, can be avoided or minimized by adding the antireflection layer 33 over the overcoat layer 32. Quantification of this performance is described below in the METHOD section.

As shown on WGP 30 in FIG. 3, the antireflection layer 33 can include multiple thin-film layers 31 located on the overcoat layer 32, extending continuously across the overcoat layer 32, and capable of reducing reflection of incident light on the overcoat layer 32. One example of a thin-film antireflection layer 33 is: at least two pairs of layers with each pair including a layer of silicon dioxide and a layer of 95% $ZrO_2$ plus 5% $TiO_2$, and a thickness of each layer is between 30 and 300 nanometers.

As shown on WGP 40 in FIG. 4, the antireflection layer 33 can include multiple protrusions 41, formed in an array, located on the overcoat layer 32. The protrusions 41 can be designed for reducing reflection of incident light on the overcoat layer 32. For example, each protrusion 41 can have a width $W_{41}$ and a height $H_{41}$ that are less than 700 nanometers.

As shown in FIG. 6, a conformal-coat layer 61 can be located over the wires 13. The conformal-coat layer 61 can cover an exposed surface of the wires 13. The conformal-coat layer 61 can also be located over an exposed surface of the substrate 11 ("exposed surface" meaning a surface of the substrate not covered with wires 13). Use of a conformal-coat layer 61 can be beneficial because by following a contour of the wires 13 and an exposed surface of the substrate 11, conformal-coat layer 61 thickness $T_{61}$ can be minimized, thus reducing any detrimental effect of the conformal-coat layer 61 on WGP performance. For example, a maximum thickness of the conformal-coat layer 61 can be <5 nanometers (nm) in one aspect, <10 nm in another aspect, <25 nm in another aspect, or <50 nm in another aspect.

The conformal-coat layer 61 can include an oxidation-barrier layer, a moisture-barrier layer, or both. Oxidation of WGP wires 13 can degrade performance of the WGP, by adversely affecting contrast or Rs. An oxidation-barrier layer can reduce oxidation of the wires 13, and thus reduce or avoid such WGP performance degradation. The term "oxidation-barrier" means a first material capable of reducing the ingress of oxygen into a second material, which may cause the second material to oxidize. An oxidation barrier can be placed on the wires 13 to protect the wires 13 from oxidation. Non-limiting examples of chemicals that can be used as an oxidation-barrier layer include: aluminum oxide, silicon oxide, silicon nitride, silicon oxynitride, silicon carbide, or combinations thereof.

WGP corrosion can degrade WGP performance. For example, water can condense onto the WGP and wick into narrow channels 15 between wires 13 due to capillary action. The water can then corrode the wires 13. Corroded regions can have reduced contrast, changed Rs, or can fail to polarize at all. A moisture-barrier layer can resist corrosion. A moisture-barrier layer can protect the wires 13 from water or other corrosion. Examples of chemicals that can be used as a moisture-barrier layer include, but are not limited to: hafnium oxide, zirconium oxide, amino phosphonate, or combinations thereof. Examples of corrosion protection chemistry are described in US patent publications U.S. Pat. No. 6,785,050 and US 2016/0291209, which are both incorporated herein by reference in their entirety.

The conformal-coat layer 61 can include rare earth oxides, for example, oxides of scandium, yttrium, lanthanum, cerium, praseodymium, neodymium, promethium, samarium, europium, gadolinium, terbium, dysprosium, holmium, erbium, thulium, ytterbium, and lutetium. These rare earth oxides can be at least part of the oxidation-barrier layer, the moisture-barrier layer, or both.

The conformal-coat layer 61 can be distinct from the wires 13, meaning (1) there can be a boundary line or layer between the wires 13 and the conformal-coat layer 61; or (2) there can be some difference of material of the conformal-coat layer 61 relative to a material of the wires 13. For example, a native aluminum oxide can form at a surface of aluminum wires 13. A layer of aluminum oxide (oxidation-barrier layer) can then be applied to the ribs (e.g. by ALD). This added layer of aluminum oxide can be important, because a thickness and/or density of the native aluminum oxide can be insufficient for protecting a core of the wires 13 (e.g. substantially pure aluminum) from oxidizing. In this example, although the oxidation-barrier layer ($Al_2O_3$) has the same material composition as a surface ($Al_2O_3$) of the wires 13, the oxidation-barrier layer can still be distinct due to (1) a boundary layer between the oxidation-barrier layer and the wires 13 and/or (2) a difference in material properties, such as an increased density of the oxidation-barrier layer relative to the native aluminum oxide.

Image Projector

The WGPs described herein can be used in an image projector, such as for example image projector 70 shown in FIG. 7 or image projector 80 shown in FIG. 8. The image projector 70 or 80 can comprise a light source 71 or 81 capable of emitting a beam of light 73 or 83, spatial light modulator(s) 77, and WGP(s) 74 according to WGP embodiments described herein.

The spatial light modulator 77 can be located to receive at least part of the beam of light 73 or 83. The spatial light modulator 77 can have a plurality of pixels, each pixel capable of receiving a signal. The signal can be an electronic signal. Depending on whether or not each pixel receives the signal, or the strength of the signal, the pixel can rotate a polarization of, or transmit or reflect without causing a change in polarization of, a part of the beam of light 73 or 83. The spatial light modulator(s) 77 can be a liquid crystal device/display (LCD) and can be transmissive, reflective, or transflective.

The WGP(s) 74 can be located in at least part of the beam of light 73 or 83 prior to entering the spatial light modulator 77, after exiting the spatial light modulator 77, or both. The WGP(s) 74 help form the image by providing polarized light to the spatial light modulator 77 and by transmitting, reflecting, or absorbing light from each pixel of the spatial light modulator 77 depending on the type and rotation of WGP 74 and whether each pixel received the signal.

A projection lens system 75 can be located to receive at least part of the beam of light 73 or 83 and can project an image. Projection lens systems 75 are described in U.S. Pat. Nos. 6,585,378 and 6,447,120, which are hereby incorporated herein by reference in their entirety. Alternatively, the beam of light 73 or 83 can be emitted directly into an eye of a user or into another device instead of into the projection lens system 75.

As shown in FIG. 7, the image projector 70 can further comprise color-splitting optics 72 and color-combining optics 78. The light source 71 can emit a beam of light 73, which can initially be unpolarized. The color-splitting optics 72 can be located to receive at least part of the beam of light 73, can be located between the light source 71 and the spatial light modulator 77 and can split the beam of light 73 into multiple, differently-colored light beams, defining colored beams $73_c$. The colored beams $73_c$ can be primary colors.

The color-combining optics 78 can be located between the spatial light modulator 77 and the projection lens system 75 (or the eye of the user or other device) and can be located to receive at least part of the colored beams $73_c$. The color-combining optics 78 can recombine at least part of the colored beams $73_c$ into a final beam or combined beam $73_f$. Color-combining optics 78 are used in computer projectors for combining different colors of light into a single image to be projected. Color-combining optics 78 are sometimes called X-Cubes, X-Cube prisms, X-prisms, light recombination prisms, or cross dichroic prisms. X-Cubes are typically made of four right angle prisms, with dichroic coatings, that are cemented together to form a cube.

The projection lens system 75 can be located to receive the combined beam 73$_f$ and can project a colored image 73$_i$. The colored image 73$_i$ can be projected onto a screen 76 or into an eye of a person.

The spatial light modulator 77 can be located to receive, in a light path between the color-splitting optics 72 and the color-combining optics 78, at least one of the colored beams 73$_c$. The image projector 70 can include a spatial light modulator 77 for each of the colored beams 73$_c$. The WGP(s) 74 can be located in at least one of the colored beams 73$_c$ prior to entering the spatial light modulator 77, after exiting the spatial light modulator 77, or both.

As shown on image projector 80 in FIG. 8, the light source 81 can sequentially emit multiple, differently-colored light beams, defining colored beams 83. The colored beams 83 can be primary colors. The projection lens system 75 (or the eye of the user or other device) can be located to receive the colored beams 83 and can project a colored image 73$_i$. The colored image 73$_i$ can be projected onto a screen 76 or into an eye of a person. The spatial light modulator 77 can be located to receive, in a light path between the light source 81 and the projection lens system 75, the colored beams 83. The WGP 74 can be located in the colored beams 83 prior to entering the spatial light modulator 77, after exiting the spatial light modulator 77, or both.

Method

A method of manufacturing a WGP can comprise some or all of the following steps, which can be performed in the following order. There may be additional steps not described below. These additional steps may be before, between, or after those described.

1. Providing an array of wires 13 located over a face 11$_f$ of a transparent substrate 11. The array of wires 13 can be substantially-parallel and elongated, with channels 15 between adjacent wires 13. The channels 15 can be air-filled. Each wire 13 can have a cross-sectional profile with a base 13$_b$ located closest to the substrate 11 and a distal end 13$_d$ located farthest from the substrate 11. Each wire 13 can have opposite sides 13$_s$ facing the channels 15 on opposite sides 13$_s$ of the wire, respectively, and extending from the base 13$_b$ to the distal end 13$_d$. See FIGS. 1-2.

2. Applying a conformal-coat layer 61 to the sides 13$_s$ and to the distal ends 13$_d$ of the wires 13 while maintaining the channels 15 air-filled. Methods of applying the conformal-coat layer 61 include sputter deposition and evaporation. Applying the conformal-coat layer 61 can include one of the following: (i) applying an oxidation-barrier layer then a moisture-barrier layer; (ii) applying the moisture-barrier layer then the oxidation-barrier layer; or (iii) applying the moisture-barrier layer or the oxidation-barrier layer. See FIG. 6 and description of the oxidation-barrier layer, moisture-barrier layer, and conformal-coat layer 61 above.

3. Applying an overcoat layer 32, over the conformal-coat layer 61, at the distal ends 13$_d$ of the array of wires 13, and spanning the channels 15 and maintaining the channels 15 air-filled. The overcoat layer 32 can include materials as described above, with mass percent as described above. The overcoat layer 32 can extend down the sides 13$_s$ of the wires 13 from the distal end 13$_d$ to the base 13$_b$. The overcoat layer 32 can include various thicknesses T$_{32}$ along the sides 13$_s$ of the wires 13, such as for example between 10 and 100 nanometers. The overcoat layer 32 can be applied by sputter deposition. See FIGS. 3-5 and description of the overcoat layer 32 above.

4. Applying an antireflection layer 33 over the overcoat layer 32. See FIGS. 3-4 and description of the antireflection layer 33 above.

In the above method, some or all of the performance lost by applying the overcoat layer 32 can be regained by applying an antireflection layer 33. Thus, one or more of the following equations can be true: $Tp_1-Tp_2<2\%$, $Tp_1-Tp_2<1.5\%$, $Tp_1-Tp_2<1\%$, or $Tp_1-Tp_2<0.5\%$, where the subscript 1 refers to performance before applying the overcoat layer 32 and subscript 2 refers to performance after applying the antireflection layer 33.

What is claimed is:

1. A wire grid polarizer (WGP) comprising:
   an array of wires located over a face of a transparent substrate, the array of wires being substantially-parallel and elongated, with channels between adjacent wires;
   each wire of the array of wires having: a cross-sectional profile with a base located closest to the substrate and a distal end located farthest from the substrate; and opposite sides facing the channels on opposite sides of the wire, respectively, and extending from the base to the distal end;
   an overcoat layer, comprising aluminum oxide, located at the distal ends of the array of wires and spanning the channels, the channels being air-filled;
   a conformal-coat layer which is distinct from the wires and that coats the sides of the wires, the distal ends of the wires between the wires and the overcoat layer, and an exposed surface of the substrate; and
   the entire conformal-coat layer has a maximum thickness of <25 nm.

2. The WGP of claim 1, wherein the maximum thickness is <5 nm.

3. The WGP of claim 1, wherein the maximum thickness is <10 nm.

4. The WGP of claim 1, wherein the overcoat layer comprises at least 90 mass percent aluminum oxide.

5. The WGP of claim 1, wherein the conformal-coat layer at a distal end of each wire does not touch the conformal-coat layer at the distal end of adjacent wires, the distal end being a farthest end of the wires from the substrate.

6. The WGP of claim 1, wherein the conformal-coat layer includes amino phosphonate.

7. A wire grid polarizer (WGP) comprising:
   an array of wires located over a face of a transparent substrate, the array of wires being substantially-parallel and elongated, with channels between adjacent wires;
   each wire of the array of wires having: a cross-sectional profile with a base located closest to the substrate and a distal end located farthest from the substrate; and opposite sides facing the channels on opposite sides of the wire, respectively, and extending from the base to the distal end;
   an overcoat layer located at the distal ends of the array of wires and spanning the channels, the channels being air-filled; and
   a conformal-coat layer that entirely conforms to a topology of the wires and coats the sides of the wires, the distal ends of the wires between the wires and the overcoat layer, and an exposed surface of the substrate.

8. The WGP of claim 7, wherein the overcoat layer comprises aluminum oxide.

9. The WGP of claim 7, further comprising an antireflection layer over the overcoat layer, the antireflection layer including multiple protrusions formed in an array, the protrusions designed for reducing reflection of incident light on the overcoat layer, and each protrusion having a width and a height of less than 700 nanometers.

10. The WGP of claim 7, further comprising an antireflection layer located over the overcoat layer, the antireflection layer including multiple thin-film layers extending continuously across the overcoat layer and capable of reducing reflection of incident light on the overcoat layer, the multiple thin-film layers including at least two pairs of layers, each layer with a thickness of between 30 and 300 nanometers.

11. The WGP of claim 7, wherein the conformal-coat layer includes hafnium oxide.

12. The WGP of claim 7, wherein the conformal-coat layer includes zirconium oxide.

13. The WGP of claim 7, wherein the conformal-coat layer includes a rare earth oxide.

14. The WGP of claim 7, wherein the conformal-coat layer is distinct from the wires, and the conformal-coat layer includes aluminum oxide, silicon oxide, silicon nitride, silicon oxynitride, silicon carbide, or combinations thereof.

15. The WGP of claim 14, wherein the conformal-coat layer includes amino phosphonate.

16. The WGP of claim 7, wherein a maximum thickness of the entire conformal-coat layer is <10 nm.

17. The WGP of claim 7, wherein a maximum thickness of the entire conformal-coat layer is <25 nm.

18. The WGP of claim 7, wherein the conformal-coat layer at a distal end of each wire does not touch the conformal-coat layer at the distal end of adjacent wires, the distal end being a farthest end of the wires from the substrate.

19. The WGP of claim 7, wherein the conformal-coat layer includes amino phosphonate.

20. The WGP of claim 7, wherein the conformal-coat layer includes aluminum oxide and hafnium oxide and the entire conformal-coat layer has a maximum thickness of <25 nm.

* * * * *